(12) United States Patent      (10) Patent No.:    US 12,589,952 B2

Lidberg                      (45) Date of Patent:     Mar. 31, 2026

(54) VACUUM LIFTING TUBE ARRANGEMENT HAVING EXTENSION-LOCKABLE LIFTING TUBE

(71) Applicant: TAWI AB, Kungsbacka (SE)

(72) Inventor: Niklas Lidberg, Kungsbacka (SE)

(73) Assignee: TAWI AB, Kungsbacka (SE)

( * ) Notice: Subject to any disclaimer, the term of this patent is extended or adjusted under 35 U.S.C. 154(b) by 177 days.

(21) Appl. No.: 18/426,747

(22) Filed: Jan. 30, 2024

(65) Prior Publication Data

US 2025/0243013 A1     Jul. 31, 2025

(30) Foreign Application Priority Data

Jan. 19, 2024    (EP) ...................................... 24152855

(51) Int. Cl.
     *B66C 1/02*         (2006.01)
     *B65G 47/91*       (2006.01)

(52) U.S. Cl.
     CPC .......... *B65G 47/917* (2013.01); *B66C 1/0256* (2013.01)

(58) Field of Classification Search
     CPC ............................ B65G 47/917; B66C 1/0256
     USPC ........................................................ 221/211
     See application file for complete search history.

(56) References Cited

U.S. PATENT DOCUMENTS

| | | | | |
|---|---|---|---|---|
| 4,884,938 | A | * | 12/1989 | Fujita .................... B66C 1/0256 |
| | | | | 414/752.1 |
| 5,031,414 | A | * | 7/1991 | Walter .................. B66C 1/0212 |
| | | | | 62/298 |
| 5,035,456 | A | | 7/1991 | Messinger |
| 5,039,274 | A | * | 8/1991 | Bennison ............. B65G 47/914 |
| | | | | 198/468.4 |
| 6,056,500 | A | | 5/2000 | Wicen |
| 6,367,855 | B1 | | 4/2002 | Schmalz et al. |
| 2007/0094720 | A1 | | 4/2007 | Galambos |
| 2007/0241575 | A1 | | 10/2007 | Lundin |
| 2008/0213077 | A1 | * | 9/2008 | Tanaka ................... B66C 1/0256 |
| | | | | 414/744.8 |
| 2016/0075537 | A1 | * | 3/2016 | Lundin ................... F16L 11/00 |
| | | | | 138/104 |
| 2019/0275684 | A1 | * | 9/2019 | Burt ...................... B66C 1/0212 |

(Continued)

FOREIGN PATENT DOCUMENTS

| | | |
|---|---|---|
| DE | 19817801 | 9/1999 |
| EP | 3887821 | 6/2021 |

(Continued)

OTHER PUBLICATIONS

Extended European Search Report, EP Application No. 24152855.3, prepared by the Hague, European Patent Office, 5 pages, dated Jul. 2, 2024.

*Primary Examiner* — Gene O Crawford
*Assistant Examiner* — Ayodeji T Ojofeitimi
(74) *Attorney, Agent, or Firm* — Quarles & Brady LLP

(57)          ABSTRACT

A vacuum lifting tube arrangement is disclosed comprising a lifting tool attached to a flexible lifting tube which is retractable from an extended state and extendible from a contracted state, respectively, and a controllable source of vacuum fluidly connected to an inner volume of the flexible lifting tube, and more particularly additionally comprising a locking mechanism preventing extension of the flexible vacuum lifting tube from a contracted state upon deactivation of the source of vacuum.

11 Claims, 2 Drawing Sheets

(56)                    References Cited

U.S. PATENT DOCUMENTS

2024/0076167 A1 *    3/2024   Solomon ............... B66C 1/0281
2024/0091931 A1 *    3/2024   Gwinner ............. B25J 15/0616

FOREIGN PATENT DOCUMENTS

WO      WO-2014/189435        11/2014
WO      WO-2021/145815         7/2021

* cited by examiner

VACUUM LIFTING TUBE ARRANGEMENT HAVING EXTENSION-LOCKABLE LIFTING TUBE

FIELD OF THE INVENTION

The present invention relates to a vacuum lifting tube arrangement comprising a lifting tool attached to a flexible lifting tube which is retractable from an extended state and extendible from a contracted state, respectively, and a controllable source of vacuum fluidly connected to an inner volume of the flexible lifting tube, and more particularly such arrangement having a locking mechanism preventing extension of the flexible vacuum lifting tube from a contracted state upon deactivation of the source of vacuum.

BACKGROUND OF THE DISCLOSURE

Vacuum lifting tube arrangements comprising a flexible lifting tube and a lifting tool, such as e.g. a suction foot, are known in the art and are used to assist an operator in lifting objects, especially heavy objects.

WO 2014/189435 discloses a vacuum tube lifter, a lifting hose for a vacuum tube lifter and a method for controlling a vacuum tube lifter. The vacuum tube lifter preferably comprises a lifting tool, e.g. in the form of one or more suction cups that utilise the vacuum in the lifting hose for an object to be lifted. The lifting hose can be extended or contracted by adjusting the pressure inside the lifting hose. The vacuum tube lifter comprises an arrangement disposed to detect in an ongoing manner at least one parameter proportional to the momentary length of the lifting hose or a parameter proportional to a change in the momentary length of the lifting hose.

WO 2021/145815 discloses a vacuum lifting arrangement comprising a flexible lifting tube and a suction foot which can be raised and lowered by means of the flexible lifting tube being retractable and extendible. An operator uses operating means on the housing of the lifting foot to raise and lower the suction foot and to release the load from the suction foot, which operating means are connected to a valve arrangement which controls the vertical position of the suction foot as well as controls the release of a load when attached to the suction foot. By placing the valve arrangement downstream of the suction foot, the distance to the valve arrangement from the operator can be increased and the noise level reduced.

In order for the vacuum tube lifter to be ready for being used in a lifting operation, a vacuum generator connected to the lifting tube is typically being run constantly also when there is no lifting activity, e.g. during a period of time when the vacuum tube lifter is only used intermittently.

However, in order to reduce energy demand and energy consumption for a vacuum lifting tube arrangement, it would be desirable to run the vacuum generator only when needed, i.e. during a lifting operation, and not during an idle period between two lifting operations. When the vacuum generator of a vacuum lifting tube arrangement of the prior art is deactivated when the lifting tube is in a contracted state, the vacuum tube will eventually, typically only within a matter of seconds, assume its normal relaxed extended state due to a gradual increase of the pressure inside the lifting tube until the pressure inside the tube is essentially equal to ambient pressure.

It would be desirable to provide a vacuum lifting tube arrangement, wherein lowering of the lifting tube after release of a lifted object is prevented in instances when vacuum generation is deactivated. It is an object of the present invention to provide such vacuum lifting tube arrangement.

SUMMARY OF THE INVENTION

According to the present invention, for a vacuum lifting tube arrangement of the prior art comprising a source of vacuum, a lifting tool, and an extendible and contractible flexible vacuum lifting tube, the above object has been achieved by means of a rotatable reel, a wire or cord, and a locking mechanism configured to lock the rotatable reel from rotation when the source of vacuum is deactivated, thereby preventing release of wire or cord from the rotatable reel.

Accordingly, the invention relates to a vacuum lifting tube arrangement 10, comprising: a support structure 20; a vacuum source 30; lifting tool 40 configured to engage with an object 100 to be lifted; a flexible lifting tube 50 having an upper end 70 and a lower end 60, respectively, the lower end 60 of the flexible lifting tube 50 being attached to the lifting tool 40, and the upper end 70 of the flexible lifting tube 50 being secured to the support structure 20, a vacuum conduit 35 fluidly connecting an inner volume 65 of the flexible lifting tube 50 with the vacuum source 30, said flexible lifting tube 50 being configured to be contractible from a relaxed extended state, and extendible from a contracted state, respectively, by regulating the pressure inside the flexible lifting tube 50; a controllable height-regulating valve 75 configured to, in an open state of said valve, fluidly connect at least one of the inner volume 65 of the flexible lifting tube 50, and the vacuum conduit 35, to ambient air; an input device 90 configured to send a height control signal S1 indicative of a target height of the lifting tool 40, a control unit 130 configured to receive the height control signal S1 indicative of the target height of the lifting tool 40, and, to control a current state of the height-regulating valve 75 in proportion to the target height by sending a valve control signal S2 to the height-regulating valve 75, said vacuum lifting tube arrangement additionally comprising: a rotatable reel 120 secured to a lower end 13 or an upper end 15 of the vacuum lifting tube arrangement 10; a wire or cord 80 having a first end 83 and a second end 85, the first end 83 being secured to the upper end 15 or the lower end 13 of the vacuum lifting tube arrangement 10, the second end 85 being secured to the rotatable reel 120; an actuator 110 configured to receive an actuation control signal S3, and to, upon actuation, engage with the rotatable reel 120, thereby preventing the rotatable reel 120 from rotating in a direction releasing cord or wire 80 from the rotatable reel 120, wherein the control unit 130 is further configured to, essentially at the same time, deactivate the vacuum source 30 by sending a deactivation control signal S4 to the vacuum source 30, and to prevent the rotatable reel 120 from rotating in a direction releasing cord or wire 80 from the rotatable reel 120 by sending the actuation control signal S3 to the actuator 110.

Preferably, the actuation of actuator 110 is only transient, until engagement of the actuator with the rotatable reel 120 has been achieved.

The present invention is especially suited for vacuum lifting tube arrangements wherein the lifting height valve 75 and source of vacuum 30, typically for noise-reduction purposes, are located further upstream of the lower end 13 of the vacuum lifting tube arrangement 10. An operator operating such embodiment may not be able to distinguish whether the vacuum source is in an activated state or in a deactivated state.

In a preferred embodiment, after a predetermined period of time of absence of a new, different, target height control signal S1' from input device 90, such as due to inactivity of an operator operating the inventive vacuum lifting tube arrangement 10, e.g. 3 seconds, or another suitable period of time, which could be sensed by no altering of the target height by the operator during such period of time, the source of vacuum is deactivated and the actuator engages with the rotatable reel 120, thereby preventing the rotatable reel 120 from rotating in a direction releasing cord or wire 80 from the rotatable reel.

In a further preferred embodiment, when the vacuum source 30 is in a deactivated state and the input device 90 sends a new, different, target height control signal S1', the vacuum source 30 is activated. Upon release of strain in the cord or wire 80 due to contraction of the the lifting tube 50, the actuator 110, which is preferably spring-loaded, is released from engagement with the rotatable reel 120.

Further embodiments and advantages of the invention will be apparent from the following detailed description and appended claims.

BRIEF DESCRIPTION OF THE DRAWINGS

In FIGS. 2 and 3, a part of the side of the reel 120 facing the viewer has been cut away in order to show the cord which is wound on the reel and the end the second end 85 which is secured to the rotatable reel.

DETAILED DESCRIPTION OF THE INVENTION

Figure 1:
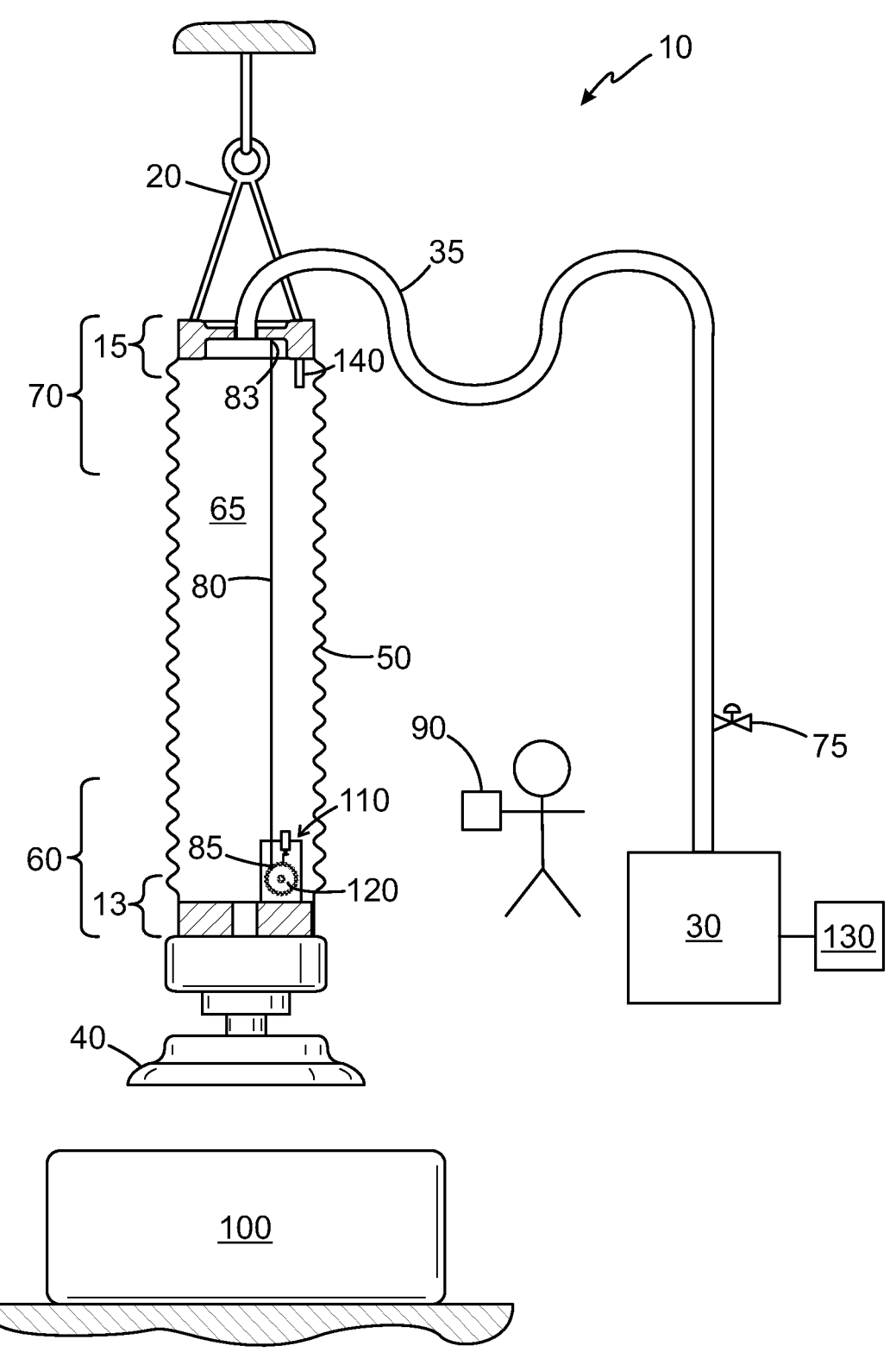
FIG. 1 shows a schematic overview of a preferred embodiment of the inventive vacuum lifting tube arrangement 10, wherein the lifting tube 50 is shown in cross-section for improved visibility of the inner volume 65 thereof. In the embodiment shown, the input device 90 is a remote control.
Figure 3:
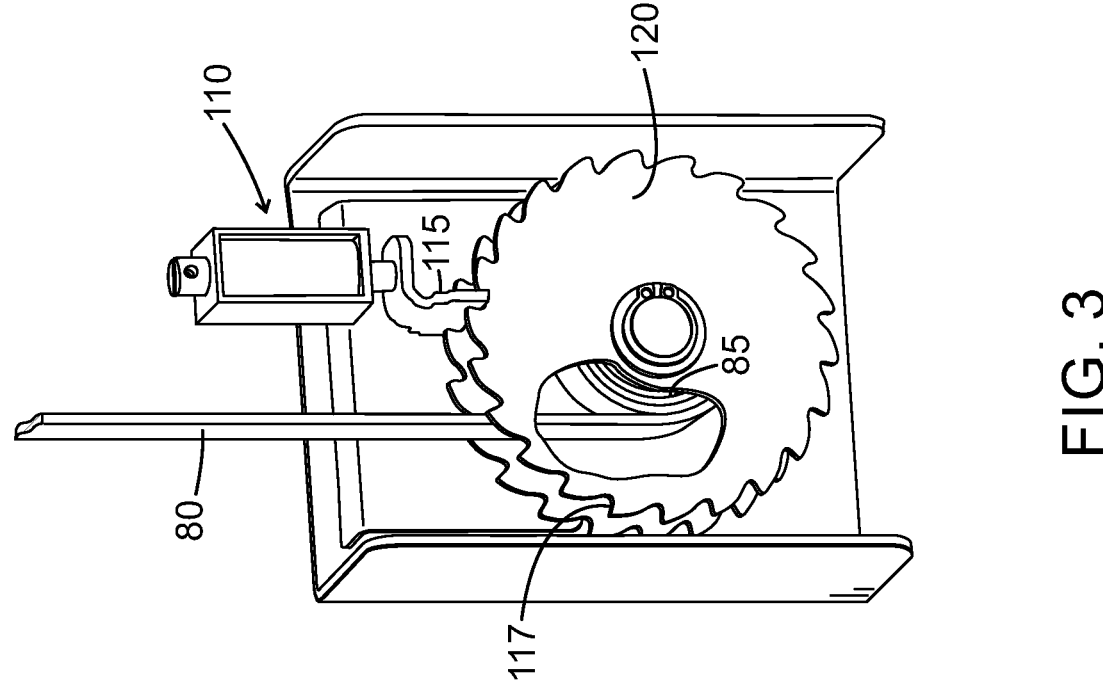
FIG. 3 shows same embodiment of actuator 110 as in FIG. 2, but in an actuated state, wherein locking of reel 120 is accomplished and thereby the cord 80 is prevented from being released from reel 120.

The actuator 110 is configured to engage with the rotatable reel 120 upon actuation, thereby preventing the rotatable reel 120 from rotating in a direction releasing cord or wire 80 from the rotatable reel 120. In preferred embodiments the actuator is biased, such as by a spring, so as the disengage from engagement with the reel upon release of strain in the wire or cord, such as by contraction of the flexible lifting tube 50. When the actuator 110 is in an engaged stage, the actuator preferably stays in such state due to friction caused by strain in the wire or cord 80 due to the force of gravity upon the lifting tube 50.

The actuator 110 comprises a locking member 115 configured to engage with a corresponding locking member 117 provided on the rotatable reel 120. When locking member 115 is in engagement with locking member 117 the rotatable reel is prevented from rotating in a direction releasing wire or cord 80 from the reel. The design of locking member 117 is not critical and can be embodied differently, provided that rotation-stopping engagement and can be accomplished with locking member 115. For example, locking member 117 can comprise teeth or protrusions provided on the on the periphery or on a side of the reel 120.

The actuator 110 could be mechanically, electromechanically, or pneumatically operated. It is generally preferred that the actuator is electromechanically operated. In preferred embodiments the actuator comprises a solenoid.

Figure 2:
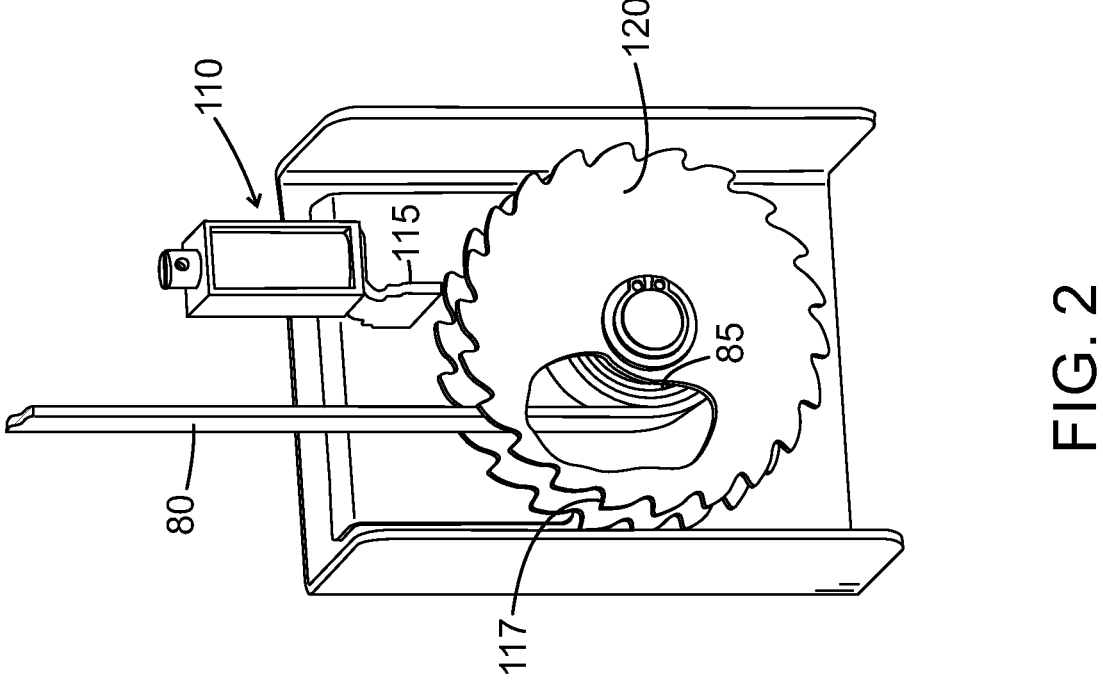
FIG. 2 shows a preferred embodiment of an actuator 110 comprising a solenoid and a locking member 115, and a corresponding locking member 117 of the rotatable reel 120. The rotatable reel 120 shown in FIG. 2 is a spring driven auto rewind reel. The actuator 110 is in a non-actuated state, with no locking of the rotatable reel 120.

In a preferred embodiment such as shown in FIG. 2, the actuator 110 comprises a solenoid connected to a locking member 115 configured to engage with a corresponding locking member 117 provided on the rotatable reel 120, such as a protrusion or tooth 117 provided on the periphery of the rotatable reel 120. The locking member 115 is preferably spring loaded, so that the locking member 115 will return from engagement to its original non-engaging resting position when the strain in the wire or cord 80 is released as described above.

The rotatable reel 120 preferably is an auto rewind reel configured to rewind the cord or wire 80 onto the reel upon slackening of the latter during contraction of the flexible lifting tube 50. The auto rewind of the reel is preferably spring driven.

In embodiments wherein the suction tool 40 is a suction foot, the suction foot is preferably selected so as to exhibit an engagement surface area that is larger than the cross-sectional area of the flexible lifting tube 50, more preferably the engagement surface area of the suction foot 40 is at least 2.5 times the cross-sectional area of the flexible lifting tube 50.

The suction foot 40 could be comprised of an array of a multitude of suction cups (not shown), such as e.g. used for lifting objects 100 having a large lifting surface to be engaged by the suction foot.

In one embodiment, the suction foot 40 is detachable from the flexible lifting tube 50, so as to be replaceable with another lifting tool, e.g. with a lifting hook (not shown).

The length of the flexible lifting tube is not critical, and will primarily be dependent on the intended maximum lifting height. Typically, the length of the lifting tube in its fully extended state will range from 0.5 m to 4 m, such as from about 1.7 m to about 2.5 m.

The rotatable reel 120 can be affixed to either the upper end or the lower end of the lifting tube. It is preferred that the first end of the wire or cord 80 is attached to an end 60, 70 of the lifting tube 50 opposite to the end of the lifting tube to which end the rotatable reel 120 is attached. In a case where both the rotatable reel 120 and the first end 83 of the wire or cord 80 is attached to one and the same end 60, 70 of the lifting tube 50, a pulley or the like (not shown), over which the wire or cord 80 runs, must be secured to the opposite end 60, 70 of the lifting tube 50.

The rotatable reel 120 and wire or cord 80 can be arranged inside the flexible lifting tube 50 or outside the flexible lifting tube 50.

The type of vacuum source is not critical and can be selected as desired. For example, a vacuum pump can be used, and more particularly a side channel blower. If a more direct onset and offset of the vacuum is desired upon activation and deactivation, respectively, of the vacuum source 30, an ejector-type vacuum pump could be used as the source of vacuum 30.

An operator operating the inventive vacuum lifting tube arrangement 10 can control the desired target height of the lifting tool 40 on an input device 90, which may preferably be a remote control or a control provided at lower portion 13 of the vacuum lifting tube arrangement 10, such as e.g. at the lower end of the lifting tube 50.

Input of a desired target height of the lifting tool 40 on user device 90 could also be provided by an algorithm or a computer program run on a computer.

Upon input of a desired target height of the lifting tool 40 on user device 90 a height control signal S1 indicative of the target height of the lifting tool 40 is sent from the input device 90 to a control unit 130. The control unit 130 in turn sends to the controllable lifting height regulating valve 75 a valve control signal S2 proportional to the target height. When a next, different, desired target height of the lifting tool 40 is input on the input device 90, the input device sends a height control signal S1' indicative of the next, different, target height to the control unit 130. The control unit 130 in turn sends to the controllable lifting height regulating valve 75 a valve control signal S2 proportional to the new, different, target height. When the vacuum source 30 is deactivated, such as by the operator using the input device 90, the control unit 130 sends a vacuum source deactivation control signal S4 to the vacuum source 30, and also an actuation control signal S3 to the actuator 110. The actuator will thereby lock the reel 120 in its present position from further rewinding of cord or wire 80 therefrom. In preferred embodiments, the control unit 130 is configured to detect a selected period of time of absence of a height control signal S1' indicative of a next, different, target height of the lifting tool 40, and to send, upon detection of such selected period of time, an actuation control signal S3 to the actuator 110 and also a deactivation control signal S4 to the vacuum source 30. The period of time can be selected and set as appropriate, e.g. dependent on the frequency of the intended lifting operations. In preferred embodiments, a pressure sensor 140 configured to sense a current pressure in the inner volume 65 of the flexible lifting tube 50 is provided. The pressure sensor 140 sends to the control unit 130 a pressure signal S6 proportional to the current pressure in the inner volume 65. The control unit 130 compares the pressure signal S6 with a selected threshold pressure $P_T$, and, when the current pressure indicated by the pressure signal S6 is lower than the selected threshold pressure $P_T$, the control unit 130 in an instance when the selected period of time has been detected prevents deactivation of the vacuum source 30 and actuation of the actuator 110, by not sending an deactivation control signal S4 to the vacuum source 30 and by not sending an actuation control signal S3 to the actuator 110 until the control unit receives a pressure signal S6 proportional to a current pressure in the inner volume 65 above the threshold pressure $P_T$. When the vacuum source 30 is in an inactive state and a desired target height of lifting tool 40 is input on input device 90, such as by an operator, the input device 90 sends a height control signal S1 or S1' indicative of the target height of the lifting tool 40 to the control unit 130, the control unit 130 sends a vacuum source activation control signal S5 to the vacuum source 30 thereby activating the vacuum source 30. Upon release of strain in the wire or cord 80 due to contraction of the flexible lifting tube 50 the locking members disengages from each other, thereby allowing the reel 120 to rotate in a direction releasing wire or cord 80 from the reel.

LIST OF REFERENCE NUMERALS USED

10 vacuum lifting tube arrangement
13 lower portion of the vacuum lifting tube arrangement 10

6

15 upper portion of the vacuum lifting tube arrangement 10
20 support structure
30 vacuum source
35 vacuum conduit
40 lifting tool
50 flexible lifting tube
60 upper end of flexible lifting tube
65 inner volume of flexible lifting tube
70 lower end of flexible lifting tube
75 controllable lifting height regulating valve
80 wire or cord
83 first end of wire or cord 80
85 second end of wire or cord 80
90 input device
100 object to be lifted
110 actuator
115 locking member of actuator
117 locking member of rotatable reel
120 rotatable reel
130 control unit
140 pressure sensor
S1 height control signal indicative of a target height
S2 valve control signal proportional to target height
S3 actuation control signal
S4 vacuum source deactivation control signal
S5 vacuum source activation control signal
S6 pressure signal

FURTHER ASPECTS OF THE INVENTION

Further aspects of the invention include:
Aspect 1: A vacuum lifting tube arrangement (10), comprising: a support structure (20); a vacuum source (30); lifting tool (40) configured to engage with an object (100) to be lifted; a flexible lifting tube (50) having an lower end (60) and a upper end (70), respectively, the lower end (60) of the flexible lifting tube (50) being attached to the lifting tool (40), and the upper end (70) of the flexible lifting tube (50) being secured to the support structure (20), a vacuum conduit (35) fluidly connecting an inner volume (65) of the flexible lifting tube (50) with the vacuum source (30), said flexible lifting tube (50) being configured to be contractible from a relaxed extended state, and extendible from a contracted state, respectively, by regulating the pressure inside the flexible lifting tube (50); a controllable height-regulating valve (75) configured to, in an open state of said valve, fluidly connect at least one of the inner volume (65) of the flexible lifting tube (50), and the vacuum conduit (35), to ambient air; an input device (90) configured to send a height control signal (S1) indicative of a target height of the lifting tool (40), a control unit (130) configured to receive the height control signal (S1) indicative of the target height of the lifting tool (40), and, to control a current state of the height-regulating valve (75) in proportion to the target height by sending a valve control signal (S2) to the height-regulating valve (75),
characterized in
additionally comprising: a rotatable reel (120) secured to a lower portion (13) or an upper portion (15) of the vacuum lifting tube arrangement (10); a wire or cord (80) having a first end (83) and a second end (85), the first end (83) being secured to the upper portion (15) or the lower portion (13) of the vacuum lifting tube arrangement (10), the second end (85) being secured to the rotatable reel (120); an actuator (110) configured to receive an actuation control signal (S3), and to, upon actuation, engage with the rotatable reel (120), thereby preventing the rotatable reel (120) from rotating in a direction releasing cord or wire (80) from the rotatable reel (120), wherein the control unit (130) is further configured to, essentially at the same time, deactivate the vacuum source (30) by sending a deactivation control signal (S4) to the vacuum source (30), and to prevent the rotatable reel (120) from rotating in a direction releasing cord or wire (80) from the rotatable reel (120) by sending the actuation control signal (S3) to the actuator (110).

Aspect 2: The vacuum lifting tube arrangement (10) of Aspect 1, wherein the control unit (130) is further configured to detect a selected period of time of absence of a height control signal (S1') indicative of a next, different, target height of the lifting tool (40), and to send, upon detection of such selected period of time, the actuation control signal (S3) to the actuator (110), and, the deactivation control signal (S4) to the vacuum source (30).

Aspect 3: The vacuum lifting tube arrangement (10) of Aspect 2, additionally comprising a pressure sensor (140) configured to sense a current pressure in the inner volume (65) of the flexible lifting tube (50) and to send to the control unit (130) a pressure signal (S6) proportional to the current pressure, wherein the control unit (130) is further configured to receive the pressure signal (S6) proportional to the current pressure prevent and to compare said pressure signal (S6) with a selected threshold pressure ($P_T$), and, when the current pressure indicated by the pressure signal (S6) is lower than the selected threshold pressure ($P_T$), to prevent deactivation of the vacuum source (30) in an instance when the selected period of time has been detected, by not sending the deactivation control signal (S4) to the vacuum source (30), and to prevent actuation of the actuator (110) by not sending the actuation control signal (S3) to the actuator (110).

Aspect 4: The vacuum lifting tube arrangement (10) of any one of the preceding Aspects, wherein the control unit (130) is further configured to, when the vacuum source (30) is in a deactivated state and the control unit (130) receives a height control signal (S1') indicative of a next, different, target height of the lifting tool (40), send an activation control signal (S5) to the vacuum source (30).

Aspect 5: The vacuum lifting tube arrangement (10) of any one of the preceding Aspects, wherein the actuator (110) comprises a locking member (115) configured to, upon actuation of the actuator, engage with a corresponding locking member (117) provided on the rotatable reel (120), thereby, during engagement of the two locking members (115, 117) with each other, preventing the rotatable reel (120) from rotating in a direction releasing wire or cord (80) from the reel.

Aspect 6: The vacuum lifting tube arrangement (10) of Aspect 5, wherein the locking member (115) is spring-loaded.

Aspect 7: The vacuum lifting tube arrangement (10) of any one of the previous Aspects, wherein the actuator (110) comprises a solenoid.

Aspect 8: The vacuum lifting tube arrangement (10) of any one of the preceding Aspects, wherein the input device (90) is a remote control.

Aspect 9: The vacuum lifting tube arrangement (10) of any one of Aspects 1-7, wherein the input device (90)

is provided in the lower portion (13) of the vacuum lifting tube arrangement (10).

Aspect 10: The vacuum lifting tube arrangement (10) of any one of the preceding Aspects, wherein the lifting tool (40) is a suction foot fluidly connected to the inner volume (65) of the flexible lifting tube (50).

Aspect 11: The vacuum lifting tube arrangement (10) of one of the previous Aspects, wherein the lifting tool is detachable, so as to be able to be replaced with another lifting tool (40), e.g. a hook (40).

The invention claimed is:

1. A vacuum lifting tube arrangement (10), comprising:
a support structure (20);
a vacuum source (30);
a lifting tool (40) configured to engage with an object (100) to be lifted;
a flexible lifting tube (50) having a lower end (60) and a upper end (70), respectively, the lower end (60) of the flexible lifting tube (50) being attached to the lifting tool (40) and the upper end (70) of the flexible lifting tube (50) being secured to the support structure (20), a vacuum conduit (35) fluidly connecting an inner volume (65) of the flexible lifting tube (50) with the vacuum source (30), said flexible lifting tube (50) being configured to be contractible from a relaxed extended state, and extendible from a contracted state, respectively, by regulating the pressure inside the flexible lifting tube (50);
a controllable height-regulating valve (75) configured to, in an open state of said valve, fluidly connect at least one of the inner volume (65) of the flexible lifting tube (50), and the vacuum conduit (35), to ambient air;
an input device (90) configured to send a height control signal (S1) indicative of a target height of the lifting tool (40), a control unit (130) configured to receive the height control signal (S1) indicative of the target height of the lifting tool (40), and, to control a current state of the height-regulating valve (75) in proportion to the target height by sending a valve control signal (S2) to the height-regulating valve (75);
the vacuum lifting tube arrangement further comprising:
a rotatable reel (120) secured to a lower portion (13) or an upper portion (15) of the vacuum lifting tube arrangement (10);
a wire or cord (80) having a first end (83) and a second end (85), the first end (83) being secured to the upper portion (15) or the lower portion (13) of the vacuum lifting tube arrangement (10), the second end (85) being secured to the rotatable reel (120);
an actuator (110) configured to receive an actuation control signal (S3), and to, upon actuation, engage with the rotatable reel (120), thereby preventing the rotatable reel (120) from rotating in a direction releasing cord or wire (80) from the rotatable reel (120),
wherein the control unit (130) is further configured to, essentially at the same time, deactivate the vacuum source (30) by sending a deactivation control signal (S4) to the vacuum source (30), and to prevent the rotatable reel (120) from rotating in a direction releasing cord or wire (80) from the rotatable reel (120) by sending the actuation control signal (S3) to the actuator (110).

2. The vacuum lifting tube arrangement (10) of claim 1, wherein the control unit (130) is further configured to, when the vacuum source (30) is in a deactivated state and the control unit (130) receives a height control signal (S1')

indicative of a next, different, target height of the lifting tool (40), send an activation control signal (S5) to the vacuum source (30).

3. The vacuum lifting tube arrangement (10) of claim 1, wherein the actuator (110) comprises a locking member (115) configured to, upon actuation of the actuator, engage with a corresponding locking member (117) provided on the rotatable reel (120), thereby, during engagement of the two locking members (115, 117) with each other, preventing the rotatable reel (120) from rotating in a direction releasing wire or cord (80) from the reel.

4. The vacuum lifting tube arrangement (10) of claim 1, wherein the input device (90) is a remote control.

5. The vacuum lifting tube arrangement (10) of claim 1, wherein the input device (90) is provided in the lower portion (13) of the vacuum lifting tube arrangement (10).

6. The vacuum lifting tube arrangement (10) of any one of claim 1, wherein the lifting tool (40) is a suction foot fluidly connected to the inner volume (65) of the flexible lifting tube (50).

7. The vacuum lifting tube arrangement (10) of claim 1, wherein the lifting tool is detachable, so as to be able to be replaced with another lifting tool (40), e.g. a hook (40).

8. The vacuum lifting tube arrangement (10) of claim 1, wherein the control unit (130) is further configured to detect a selected period of time of absence of a height control signal (S1') indicative of a next, different, target height of the lifting tool (40), and to send, upon detection of such selected period of time, the actuation control signal (S3) to the actuator (110), and, the deactivation control signal (S4) to the vacuum source (30).

9. The vacuum lifting tube arrangement (10) of claim 8, additionally comprising a pressure sensor (140) configured to sense a current pressure in the inner volume (65) of the flexible lifting tube (50) and to send to the control unit (130) a pressure signal (S6) proportional to the current pressure, wherein the control unit (130) is further configured to receive the pressure signal (S6) proportional to the current pressure prevent and to compare said pressure signal (S6) with a selected threshold pressure ($P_T$), and, when the current pressure indicated by the pressure signal (S6) is lower than the selected threshold pressure ($P_T$), to prevent deactivation of the vacuum source (30) in an instance when the selected period of time has been detected, by not sending the deactivation control signal (S4) to the vacuum source (30), and to prevent actuation of the actuator (110) by not sending the actuation control signal (S3) to the actuator (110).

10. The vacuum lifting tube arrangement (10) of claim 3, wherein the locking member (115) is spring-loaded.

11. The vacuum lifting tube arrangement (10) of claim 1, wherein the actuator (110) comprises a solenoid.

* * * * *